United States Patent [19]
Liss et al.

[11] 3,749,461
[45] July 31, 1973

[54] BALL-BEARING RETAINER

[75] Inventors: Donald H. Liss, Newington; Gilbert W. Geiger, Southington, both of Conn.

[73] Assignee: Textron, Inc., Providence, R.I.

[22] Filed: Apr. 26, 1972

[21] Appl. No.: 247,595

[52] U.S. Cl. ............................................. 308/201
[51] Int. Cl. ........................................ F76c 19/20
[58] Field of Search..................... 308/201, 217, 196

[56] References Cited
FOREIGN PATENTS OR APPLICATIONS
1,198,221  6/1959  France................................ 308/201

*Primary Examiner*—Charles J. Myhre
*Assistant Examiner*—Frank Susko
*Attorney*—Nichol M. Sandoe, Roy C. Hopgood et al.

[57] ABSTRACT

The invention contemplates a unitary ball-bearing retainer particularly suited to axially entered detent-retained reception of a complement of bearing balls. The arrangement is such as to specifically avoid ball hang-up at angular locations between pockets, thus lending the construction to more fully automated ball-bearing assembly techniques.

8 Claims, 3 Drawing Figures

PATENTED JUL 31 1973 3,749,461
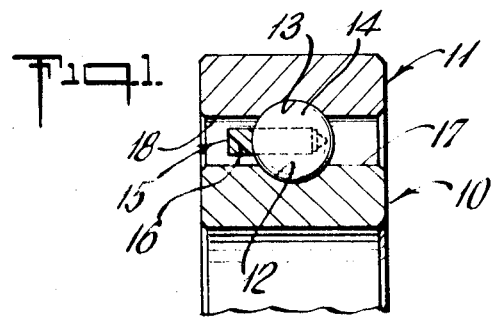
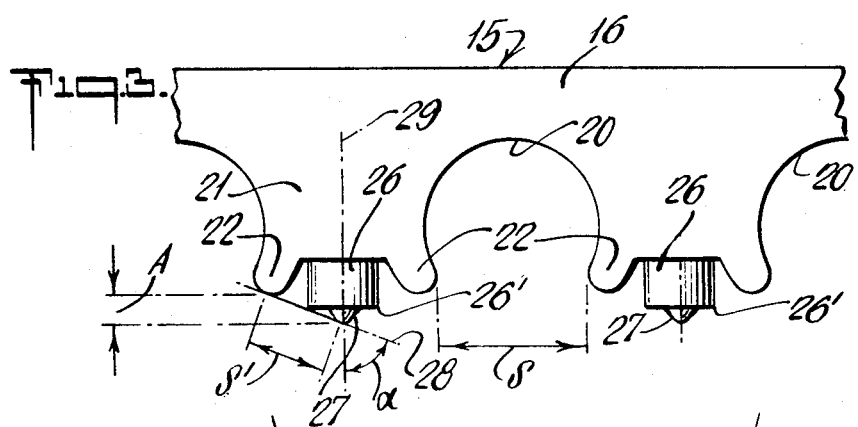
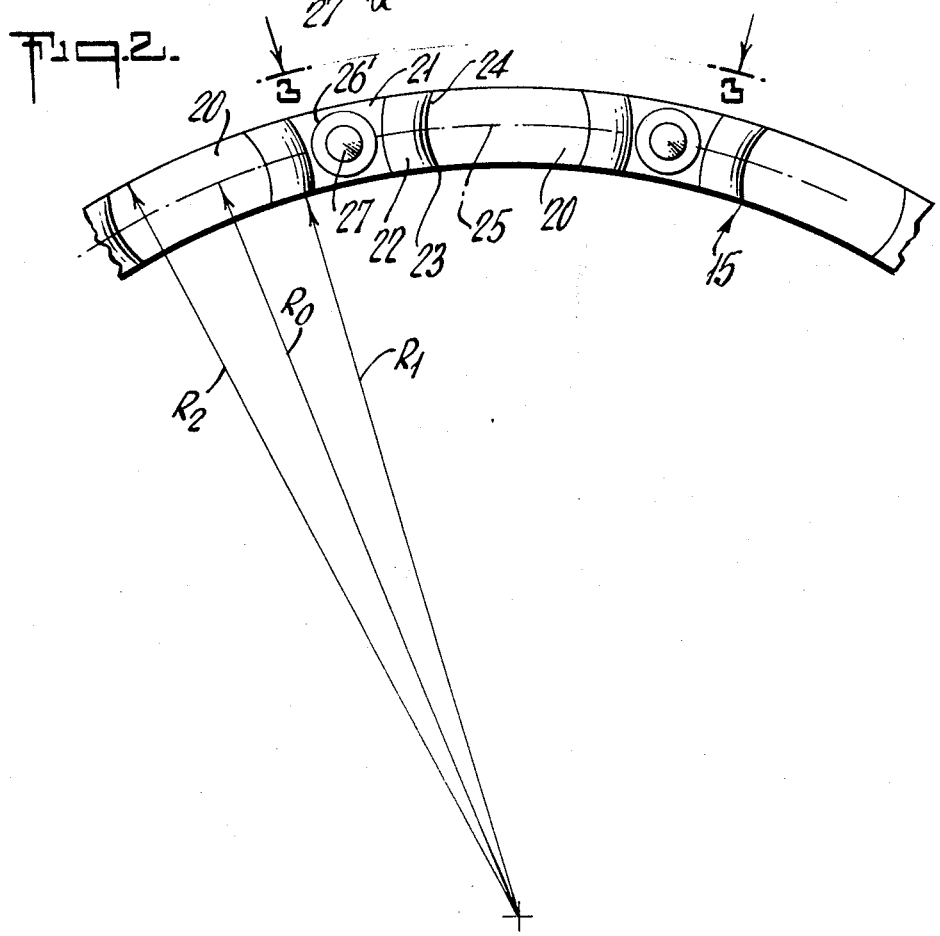

BALL-BEARING RETAINER

The invention relates to a ball-retainer construction for use in a ball-bearing assembly.

In certain types and sizes of ball bearings, the assembly technique is to introduce the complement of balls into the enlarged crescent-shaped space between eccentrically positioned inner and outer race rings, then to use a series of parallel axially extending fingers to separate the balls into correct angular spacing (thus bringing the rings into concentric relation), and finally to assemble a retainer to the spaced balls after the positioning fingers are withdrawn.

It is the object of the present invention to provide an improved retainer construction which will enable simplified assembly of a ball bearing of the character indicated.

Another object is to provide an improved retainer construction which will inherently perform ball-aligning and separating functions, for axial insertion of balls into retainer pockets.

It is a specific object to achieve the foregoing objects with a relatively simple structure, having self-lubricating properties, and enabling economies in the construction and assembly of a ball bearing.

Other objects and various further features of novelty and invention will be pointed out or will occur to those skilled in the art from a reading of the following specification, in conjunction with the accompanying drawings. In said drawings, which show, for illustrative purposes only, a preferred form of the invention:

FIG. 1 is a fragmentary sectional view of a ball bearing incorporating a retainer of the invention;

FIG. 2 is an enlarged fragmentary view in elevation of the retainer in FIG. 1; and FIG. 3 is a view taken from the aspect 3—3 of FIG. 2.

In FIG. 1, the invention is shown in application to a ball bearing, comprising inner and outer race rings 10–11 with raceways 12–13 and a complement of balls 14 riding the respective raceways. A ball retainer 15 of the invention includes a circumferentially continuous annular body 16 on one axial side of the balls 14. The body 16 has at least running clearance with the respective adjacent lands 17–18 of the rings 10–11.

Retainer 15 is preferably a single-piece integral injection-molded plastic element, of a material having self-lubricating properties, such as a high-temperature fiber-filled nylon; an illustrative suitable material is that known by the trademark FIBERFIL, being a product of Fiberfil, Inc. of Evansville, Ind.

Retainer-ring 15 may be described as self-contained within a cylinder having inner and outer radii $R_1$–$R_2$. Ring 15 has a plurality of angularly spaced radially open ball pockets 20, each formed to clear the ball size. Pockets 20 are also open to one axial end of the ring 15, thereby establishing integral angularly spaced bridges 21 between pockets. Each axial-end access to a pocket is defined by a pair of angularly spaced axially projecting resilient lips or fingers 22 integral with the respective bridges 21 bounding the pocket; for any given pocket, the lips 22 restrict axial-end access to a spacing S slightly less than the ball diameter. A lip 22 for one pocket 20 and the next adjacent lip for the next adjacent pocket are both integral projections from a single supporting bridge 21. Preferably, the wall of each pocket is smoothly continuous over a truncated sphere of slightly greater than ball diameter, the same extending continuously from one to the other of the lips 22 for the pocket, and via the respective adjacent bridges 21 which also define the pocket.

The described relatively narrow, projecting nature of each lip 22 will be understood to render the same transiently deformable, sufficient to accommodate a slight spreading which accompanies detent action, upon axial insertion of a ball 14. Once past interference with lips 22, the ball is contained in the pocket, by lips 22 which have returned to undeformed position. Preferably, the shaping of outer ends of lips 22 is such as to establish radially inner and outer corners 23-24 by which each ball derives angular and radial-positioning contact, for accurate accommodation in the applicable pocket; corners 23-24 will be understood to be at radii $R_1$–$R_2$ and therefore on opposite radial sides of the line 25 of pocket-wall centers, at radius $R_0$.

The described construction is such as to establish a substantial span between adjacent lips 22 of a given bridge 21, i.e., substantial in terms of the ball diameter. This span, therefore, presents a potential pocket or trap by which a ball 14 may be caught or hung-up, should ball-insertion alignment fail to sufficiently register with the span S. In accordance with a feature of the invention, this difficulty is avoided, without impairing described functions of the detent lips 22, by providing an integral projection 26, with preferably a rounded tip or point 27, which extends axially beyond adjacent lips 22 and which is symmetrically located between the same. The extent A of such axial projection beyond lips 22 is such as to establish a divided span S' on an alignment 28 at an incline $\alpha$ to the axis 29 of the applicable bridge 21, and the projecting circular edge 26' of projection 26 preferably substantially intersects the alignment 28. Under the circumstances, an axially presented ball will naturally be angularly displaced upon any contact at point 27, and the quickly ensuing contact at 26' wll enable the ball to avoid entrapment until such time as it has rolled over the adjacent lip 22. Should a ball 14 already have been received in the pocket, the as yet uninserted ball 14 will ride over the inserted ball, and to the next open pocket, where it may be axially entered, with the described detent action.

It will be seen that the described invention meets all stated objects with basically simple and trouble-free structure. Not only may the retainer structure be assembled to balls in the manner described, i.e., in the presence of both the inner and outer rings, but it may also be assembled to the balls in the presence of one ring alone, such as the outer ring 11, in which case the retainer 15 will hold parts 14 and 11 as a subassembly, as for unit-handling application to an inner race designed for high-thrust load components (i.e., a so-called angular-contact bearing). Still further, when the ring thickness ($R_2$, minus $R_1$) is sufficiently great in terms of the ball-to-pocket running clearance, the retainer ring 15 may be assembled to a complement of balls 14, i.e., be unit-handling without reference to either raceway.

While the invention has been described in detail for the preferred form shown, it will be understood that modifications may be made without departure from the invention.

What is claimed is:

1. A ball-bearing retainer comprising an annular body of radial thickness to be accommodated between opposed inner and outer race rings; said body having a plurality of angularly spaced radial ball-pockets sized to accommodate bearings balls of diameter substantially exceeding said thickness, thereby defining integral angularly spaced bridges between pockets, said pockets being also open to a single axial end of said body, each axial end access to a pocket being defined by a pair of angularly spaced axially projecting resilient lips integral with the respective bridges bounding such pocket, and restricting axial-end access to a spacing slightly less than the ball diameter, a lip for one pocket and the adjacent lip of the next adjacent pocket being integrally formed with each bridge between pockets, and an integral axial projection at the end of each bridge and independent of the adjacent lips of the same bridge, said projection extending axially beyond said lips; whereby in axial assembly of balls to said retainer, said projections will deflect balls from possible bridge hang-up between the lips of any given bridge.

2. The retainer of claim 1, in which for each bridge said projection has an axially directed pointed end.

3. The retainer of claim 1, in which for each bridge the span between said projection and an adjacent lip is less than ball radius.

4. The retainer of claim 1, in which said projection includes in the span between the axially projecting end thereof and each adjacent lip, an integral portion aligned with such span, whereby the chances of ball hang-up are further reduced.

5. The retainer of claim 1, in which each pocket is defined by a ball confining wall extending continuously from one to the other of the lips of the pocket and via the two bridges defining the pocket.

6. The retainer of claim 1, in which the radially inner and outer limits of said body are cylindrical, said bridges, lips and projections being contained within the radial span between said cylinders.

7. The retainer of claim 1, injection-molded of a plastic material having low-friction properties.

8. The retainer of claim 7, in which said material is a high-temperature fiber-filled nylon.

* * * * *